(12) United States Patent
Russell

(10) Patent No.: US 10,231,429 B2
(45) Date of Patent: Mar. 19, 2019

(54) PASTURE BARN

(71) Applicant: Donald C Russell, Cobden (CA)

(72) Inventor: Donald C Russell, Cobden (CA)

(*) Notice: Subject to any disclaimer, the term of this patent is extended or adjusted under 35 U.S.C. 154(b) by 0 days.

(21) Appl. No.: 15/815,972

(22) Filed: Nov. 17, 2017

(65) Prior Publication Data

US 2018/0146637 A1    May 31, 2018

(51) Int. Cl.
| | | |
|---|---|---|
| *A01K 1/12* | (2006.01) | |
| *A01K 1/00* | (2006.01) | |
| *A01K 1/02* | (2006.01) | |
| *A01K 1/06* | (2006.01) | |
| *A01K 1/015* | (2006.01) | |
| *A01K 1/01* | (2006.01) | |

(52) U.S. Cl.
CPC .............. *A01K 1/0011* (2013.01); *A01K 1/00* (2013.01); *A01K 1/015* (2013.01); *A01K 1/0209* (2013.01); *A01K 1/0606* (2013.01); *A01K 1/0613* (2013.01); *A01K 1/12* (2013.01); *A01K 1/0103* (2013.01)

(58) Field of Classification Search
CPC ...... A01K 1/0011; A01K 1/0005; A01K 1/01; A01K 1/0103; A01K 1/0135; A01K 1/0146; A01K 1/0209; A01K 1/06; A01K 1/0613; A01K 1/12; A01K 1/0151; A01K 1/0153; A01K 31/04; A01K 31/007; A01K 31/005; A01K 31/18; A01K 31/22
USPC ....... 119/14.01, 14.02, 14.03, 436, 437, 442, 119/443, 444, 447, 450, 451, 480, 479, 119/509, 516, 520, 521, 523, 525, 526, 119/527, 528, 529
See application file for complete search history.

(56) References Cited

U.S. PATENT DOCUMENTS

| | | | | |
|---|---|---|---|---|
| 4,000,718 A | * | 1/1977 | Brown | A01K 1/12 119/14.03 |
| 4,977,856 A | * | 12/1990 | Norwood | A01K 1/12 119/14.03 |
| 5,666,905 A | * | 9/1997 | Mackin | A01K 1/0047 119/448 |
| 2006/0249083 A1 | * | 11/2006 | Johansson | A01K 1/00 119/14.03 |
| 2007/0137579 A1 | * | 6/2007 | Osthues | A01K 1/0088 119/14.03 |
| 2008/0257267 A1 | * | 10/2008 | Osthues | A01K 1/0041 119/14.04 |
| 2010/0064974 A1 | * | 3/2010 | Van Den Berg | A01J 5/003 119/14.02 |
| 2011/0308469 A1 | * | 12/2011 | Vollmer | A01K 1/126 119/14.04 |

(Continued)

*Primary Examiner* — Trinh T Nguyen
(74) *Attorney, Agent, or Firm* — Kent Daniels; Daniels IP Services Ltd

(57) ABSTRACT

A barn for housing dairy cows includes a feeding and milking area, and a pasture area. The feeding and milking area comprises a plurality of feeding stations, each feeding station including: a manger configured to permit a cow to obtain dry feed; a waterer configured to permit the cow to obtain drinking water; and a head lock configured to releasably secure the cow in the feeding station while the cow is being milked. The pasture area is configured to permit a plurality of cows to lay down. The pasture area includes a raised bed composed of a bedding material and having a predetermined slope selected to facilitate removal of excess liquid from the pasture area.

13 Claims, 6 Drawing Sheets

(56) References Cited

U.S. PATENT DOCUMENTS

2013/0098295 A1\* 4/2013 Mulder .................. A01J 5/007
119/14.02
2016/0183493 A1\* 6/2016 Waybright ............... A01K 1/12
119/14.02

\* cited by examiner

PASTURE BARN

CROSS-REFERENCE TO RELATED APPLICATIONS

This application is based on, and claims priority of Canadian Patent Application No. 2,949,862 filed Nov. 29, 2016.

FIELD OF THE INVENTION

The present invention pertains to the livestock barns, and in particular to a Pasture Barn.

BACKGROUND

There are three different types of livestock barns commonly used for housing dairy cattle. These are normally referred to as the free-stall barn, the tie-stall barn and the pack-barn.

FIG. 1 is a floor-plan illustrating principal elements of a free-stall barn 2. As may be seen in FIG. 1, the free-stall barn 2 generally comprises one or more ranges of stalls 4, at least one feeding area 6, and a milking parlour 8.

Each range of stalls 4 typically comprises a number of stalls 10 (up to 200 or more, for example) disposed on a raised platform 12. Each stall 10 is sized to accommodate a single cow in either a standing or a lying position. Adjacent stalls 10 in the range 4 are separated by a partition 14, which is commonly composed of circular steel tube. The raised platform 12 is generally composed of a raised curb 16 which operates to separate the platform 12 from an alley 18 running along the length of the range. Mulch and bedding materials placed within the curb 16 define the platform 12, and provide a suitable material on which a cow may lay while it is in a stall 10. The curb 16 is placed so that when a cow defecates, a majority of the manure will tend to fall within the alley 18, which simplifies collection and removal of the manure from the barn 2. The alley 18 is typically formed of concrete or other impermeable surface (such as rubber mat, for example) to facilitate removal of manure and access to the stalls 10 using equipment such as a tractor.

The (or each) feeding area 6 is generally composed as an elongated manger 20. Various types of food for the cows may be placed in the manger 20, so that the cows may feed at will. Water-stations 22 are located at the end of each range of stalls 4, and are designed to permit one or more cows to drink at will. For example, in a free-stall barn designed to accommodate about 50 cows, each water station 22 may be provided as a steel trough of between 50 and 100 gallons capacity.

The milking parlour 8 is typically separated from the stall ranges 4 and feed area 6 by one or more holding pens 24 designed to accommodate one or more cows while they are waiting to enter the milking parlour 8 to be milked. Automated gates 26 may be provided to control the movement of cows through the holding pens 24 and milking parlour 8.

An important feature of the free-stall barn 2 is that the cows are free to roam about the barn, and so can enter or exit a stall 10 as they wish. Similarly, cows may freely access the feeding area 6 and so may eat and drink at will. When a cow has finished being milked, she may freely re-enter the main part of the barn, and so may eat and drink before returning to a stall 10 to lay down.

However, free-stall barns also suffer several limitations. For example, while the cows are free to roam about the barn, they must necessarily do so by walking through one or more alleys 18, which, as noted above, are typically formed of concrete or other impermeable surface. Due to the naturally high water content of cow manure, as well as the farmer's use of water for cleaning surfaces and controlling airborne dust within the barn, the alleys 18 are typically wet, and often become very slippery. These conditions promote diseases of the hooves as well as injuries to the legs and joints of the cows, leading to increased veterinary costs for the farmer and many lame cows that must be culled from the herd.

As is known in the art, following milking, a period of approximately 45 minutes is needed before the teat closes. Typically, when a cow has finished being milked, she will typically walk to the feeding area 6 to eat and drink before returning to a stall 10 to lay down. In many cases, she will lay down within a stall 10 less than 45 minutes after she has finished milking, which means that the teat has not yet closed. This exposes her to increased risk of infections of the udder, leading to further increased veterinary costs for the farmer.

Free-stall barns are typically constructed using a single standardized size of stall 10. Consequently, a relatively small cow will tend to defecate within the stall (rather than in the alley 18) and then lay down in the fresh manure, which can easily lead to diseases of the udder. Conversely, a relatively large cow will tend to hang out of the end of the stall 10 into the alley 18 where they are vulnerable to injuries due to their rear legs and udder being too close to the curb 16 and cleaning equipment in the alley 18. Furthermore, a cow can become trapped in a stall resulting in injury and possible death of the animal.

Up-keep of the bedding in the stalls 10 can be labour intensive, while suitable bedding materials (such as sawdust, wood shavings, sand and straw) can be expensive and difficult for the farmer to obtain.

In a free-stall barn many of the cows must walk long distances for food and water. Milking also requires the cows to walk long distances, and stand within the holding pen 24 for extended periods of time prior to being milked and being allowed to re-enter the main part of the barn area to eat, drink and lay down. This arrangement is not conducive for optimum dry matter intake or animal welfare.

Finally, because all the cows are feeding from a common manger 20 and drinking from a common water station 22, it is often impractical for the farmer to monitor the food and water intake of each cow. This information can be important because changes in the intake of a cow can be an early indicator of disease.

FIG. 2 is a floor-plan illustrating principal elements of a tie-stall barn 28. As may be seen in FIG. 2, the tie-stall barn 28 generally comprises one or more ranges of stalls 30, each of which includes an integrated manger 20. The manger 20 may be divided using barriers to enable the farmer to accurately monitor the dry feed intake of each cow. Each stall 10 is typically provided with an automated watering station 32, which enables the farmer to accurately monitor the water intake of each cow. Milking of the cows is accomplished while the cows are in their stalls.

The tie-stall barn is a very simple design in which the animal is tied all the time to a short chain that is bolted to a head rail within a stall. A major disadvantage of this type of housing is that the animal is confined to her stall all the time without the ability to exercise, lay down naturally or groom herself. Consequently, cows in a tie-stall get cramped and have difficulties getting up after being in the stall for a few months. Culling rates are high in this type of housing due to this reason. So-called cow trainers are used to try to keep the cow clean. The cow trainer is an electrical wire installed above the cows so that if the cow moves too far forwards she will touch the wire and receive an electrical shock. This tends to keep the cow positioned in the stall such when she defecates the majority of manure will tend to fall in the alley. Tie-stalls are labour intensive for scraping under each cow many times per day and since the cow stays in that stall all day she will use more bedding than a free-stall.

In order to alleviate this problem, it is known to install bottom mats within a tie-stall 10. These bottom mats typically need some kind of topical bedding material and they all wear and need to be replaced at a high cost. Like the free-stall, the cows get injured when they go through the front or get caught under the stall bars. Hock injuries are more common in the tie-stall barns than the free-stall barn due to the lack of room to get up. Since the cows are being milked at the same location as they lay down, the use of sprayers and misters can't be used to cool down the animals, leading to increased heat stress on the cows in the summer months. This problem also reduces feed intake and milk production. Due to animal welfare concerns many countries have moved to prohibit this type of housing for dairy cows.

FIG. 3 is a floor-plan illustrating principal elements of a pack barn 34. As may be seen in FIG. 3, the pack barn 34 generally comprises a pack area 36, a feeding area 6, a milking parlour 8, and water stations 22.

The feeding area 6, milking parlour 8 and water stations 22 are typically similar to those of the free-stall barn, and so will not be described in further detail here.

The pack area 36 of this type of barn replaces the range(s) of stalls 4 in the free-stall barn 2, and provides an area in which the cows may lie down. Typically, the pack area 36 is separated from the feeding area 6 and milking parlour 8 by a concrete wall 38 that includes one or more openings 40 permitting the free movement of cows. The pack area 36 is conventionally constructed by excavating a large hole (which may be as deep as 15 feet) which is then filled with layers of gravel, crushed stone, and sand to allow drainage of liquids. The sand layer is often covered by a layer of bedding material, which may be composed of straw, limestone, sawdust, and other bedding materials to keep the cows dry. Typically, the bedding layer of the pack area 36 must be regularly cultivated (e.g. twice each day) to keep the pack temperature correct so not to create an environment conducive to bacteria growth. Even with regular cultivation, the pack area 36 will often still become too wet, resulting in poor conditions for the cows and elevated levels of Somatic Cell Counts (SSCs) and Bacteria in the milk. In an effort to address this problem, it is common to design the size of the pack area 36 to provide a large area (e.g. as much as 23 square meters, or 250 square feet) for each cow, which is very expensive to construct and maintain. However, even with such a large pack area, problems of excess moisture are still encountered.

Depending on the porosity of the underlying soil and rock, liquids may not effectively drain from the base of the pack area 36, and so may tend to accumulate in the layers of gravel, crushed stone and sand. When this occurs, the bottom layers of the pack area 36 will eventually become saturated resulting in the necessity of excavating the saturated material and reconstructing the pack area 36 with new materials.

This type of housing tends to be very expensive to build and very labour intensive to maintain. In addition, the drainage of liquids from the lower portion of the pack area 36 and/or recurring disposal of saturated pack materials can lead to contamination of ground and surface water, and so can be harmful to the environment.

In addition, the cows must walk significant distances to obtain their water and feed, and must wait in the holding pens 24 for extended periods of time to get milked in the parlor 8.

A barn design that overcomes at least some of the above-noted problems would be highly desirable. More particularly, technical problems to be solved include: how to minimize distance that cows need to walk over wet and/or slippery floors in order to feed and be milked; how to minimize the need for cultivation of the pack area; how to minimize exposure of cows' feet and udders to excessive moisture and bacterial growth; and how to minimize detrimental environmental impacts of the dairy barn operation.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an improved dairy barn design.

At least one of the above-noted technical problems is solved by the combination of elements defined in appended claim 1. Further, optional features are defined in the subsidiary claims.

Accordingly, an aspect of the present invention provides a barn for housing dairy cows which includes a feeding and milking area, and a pasture area. The feeding and milking area comprises a plurality of feeding stations, each feeding station including: a manger configured to permit a cow to obtain dry feed; a waterer configured to permit the cow to obtain drinking water; and a head lock configured to releasably secure the cow in the feeding station while the cow is being milked. The pasture area is configured to permit a plurality of cows to lay down. The pasture area includes a raised bed composed of a bedding material and having a predetermined slope selected to facilitate removal of excess liquid from the pasture area.

An advantage of the present invention is that the size of the pasture area needed to accommodate a given number of cows is much smaller than the size of the pack area needed to accommodate the same number of cows in a pack barn.

A further advantage of the present invention is that it is not necessary to cultivate the pasture area in order to maintain acceptable conditions for the cows and prevent elevated levels of Somatic Cell Counts (SSCs) and Bacteria in the milk

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
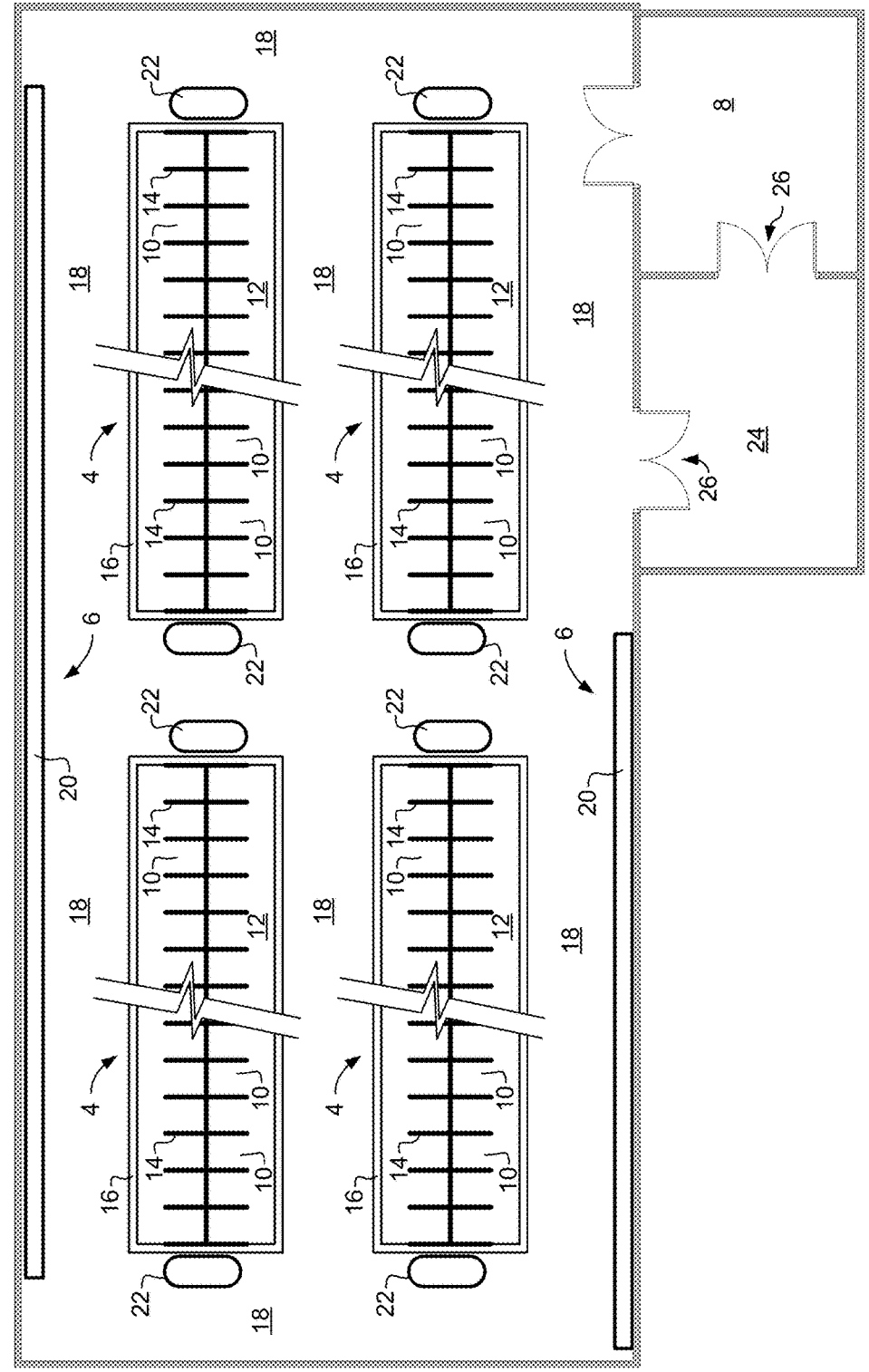
FIG. 1 is a floor-plan illustrating principal elements of a free-stall barn known in the art.
Figure 2:
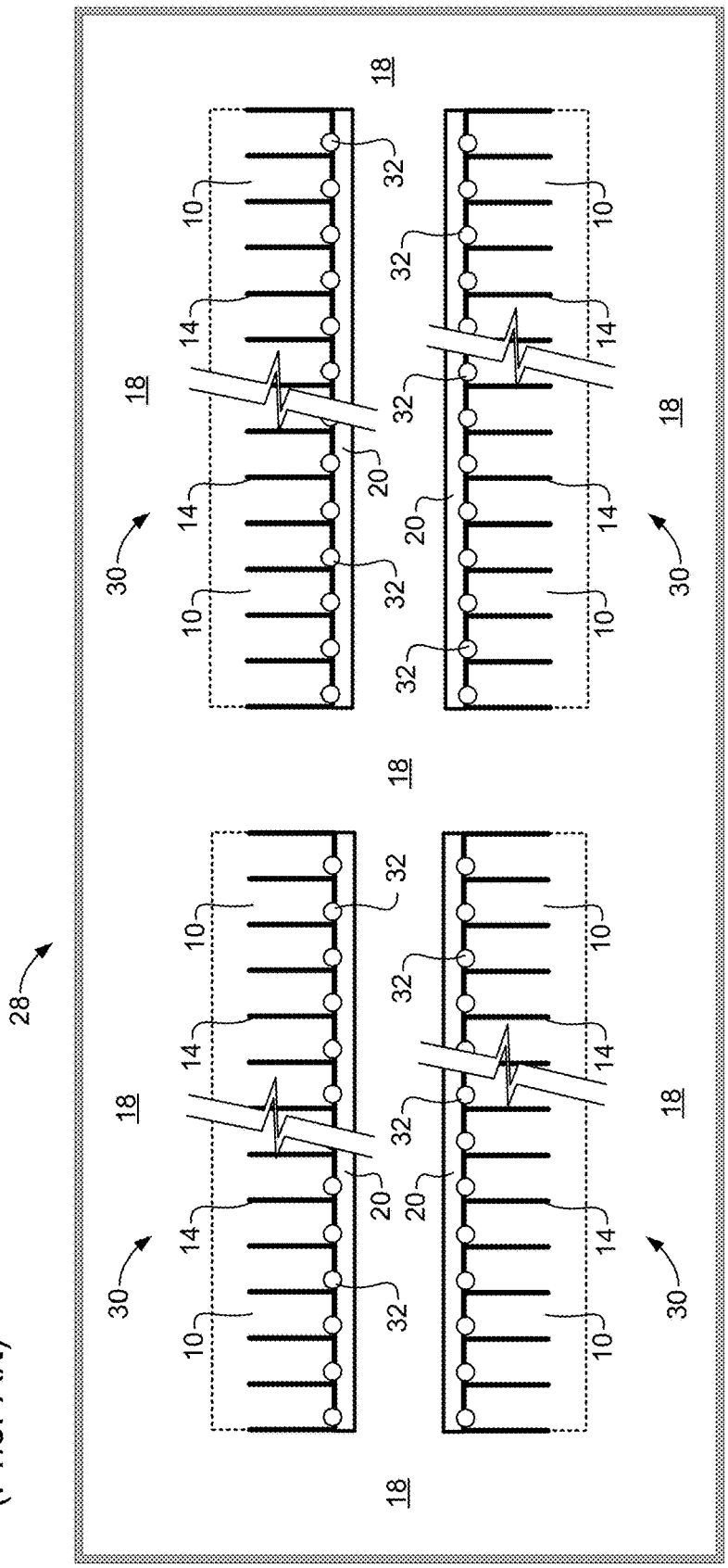
FIG. 2 is a floor-plan illustrating principal elements of a tie-stall barn known in the art.
Figure 3:
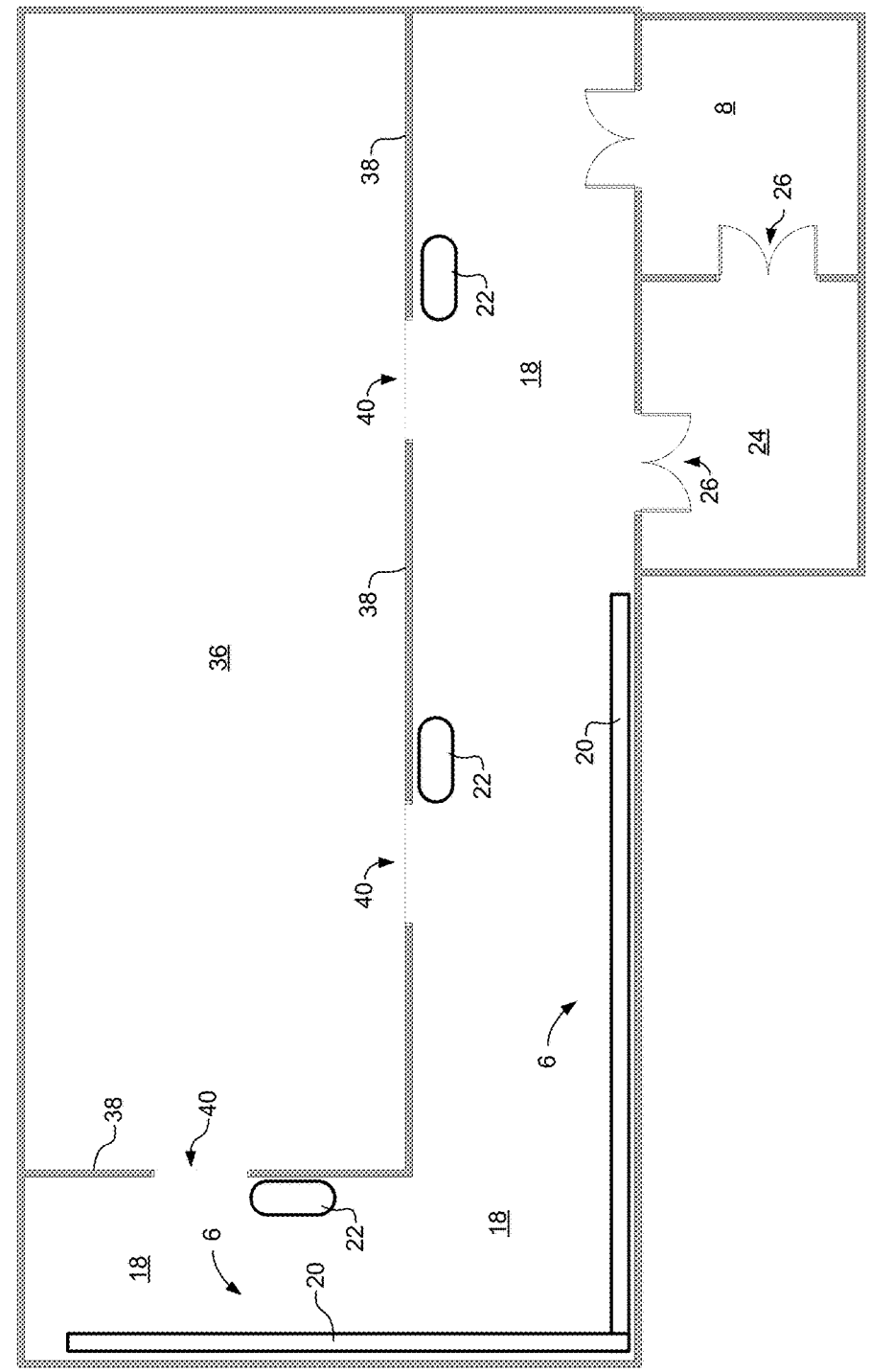
FIG. 3 is a floor-plan illustrating principal elements of a pack barn known in the art.
Figure 4:
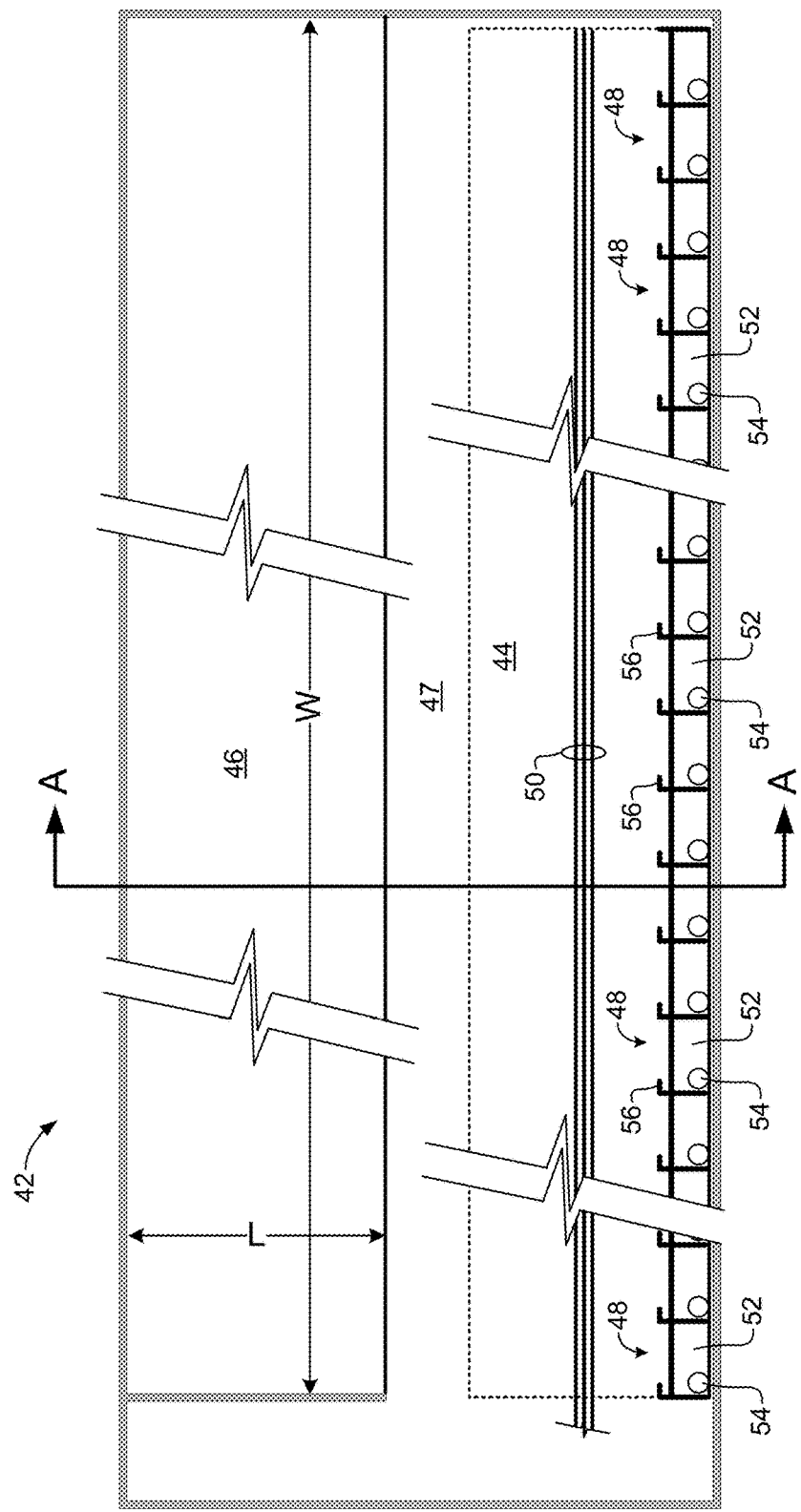
FIG. 4 is a floor-plan illustrating principal elements of a pasture barn in accordance with a representative embodiment of the present invention.
Figure 5:
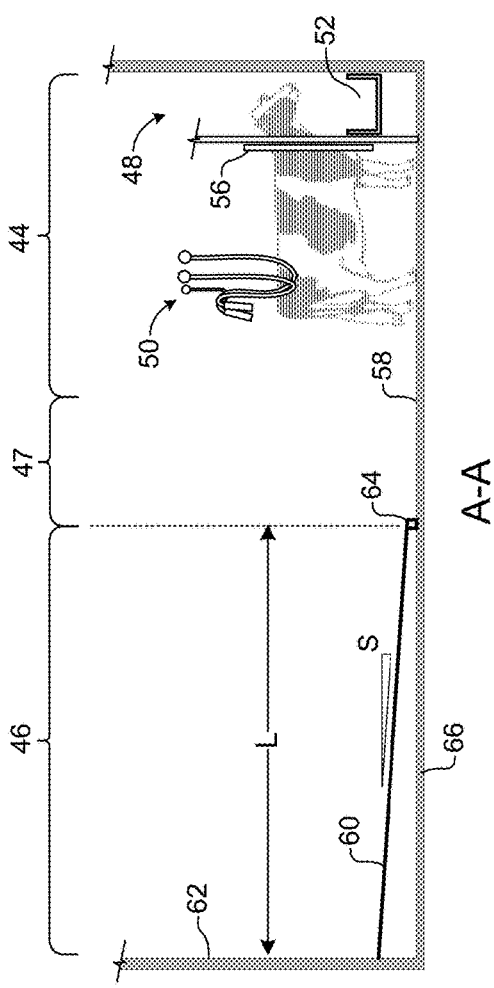
FIG. 5 is a cross-section view of the pasture barn of FIG. 4, taken along line A-A of FIG. 4.

FIGS. 4 and 5 illustrate principle elements of a pasture barn in accordance with a representative embodiment of the present invention.

As may be seen in FIGS. 4 and 5, the pasture barn 42 generally comprises a feeding and milking area 44; a pasture area 46 having a length L and a width W; and a cleaning alley 47 separating the feeding and milking area 44 from the pasture area 46.

In the illustrated embodiment, the feeding/milking area 44 includes a plurality of feeding stations 48 and an overhead pipeline milking system 50. Each feeding station 48 includes a manger 52, a water dispenser 54, and a head hold mechanism 56, all of which may be of conventional construction well known in the art. Similarly, the overhead pipeline milking system 50 may be of conventional construction and operation well known in the art. Preferably, the water dispenser 54 is an automatic water dispenser that meters water to the cow in a controlled manner.

In operation, a cow may enter a feeding station 48 at will. When she does, she may eat dry feed from the manger 52 and drink water from the water dispenser 54 at will. The provision of an individual manger 52 and water dispenser 54 in each feeding station 48 is advantageous in that it enables the farmer to monitor the dry feed and water intake of each cow.

At milking time, the cow may freely enter the feeding station 48. When she does, she may again eat dry feed from the manger 52 and drink water from the water dispenser 54 at will. However, in this scenario, the head lock mechanism 56 may also be closed to retain the cow within the feeding station 48. The overhead pipeline milking system 50 may then be connected to the cow's udder in a conventional manner to begin milking the cow. During the milking operation, the cow may continue to eat dry feed from the manger 52 and drink water from the water dispenser 54 as desired. When the milking operation is completed, the overhead pipeline milking system 50 may be disconnected from the cow's udder in a conventional manner. Following completion of the milking operation, the cow is preferably retained in the feeding station for a predetermined resting period that is long enough to enable the cow's teats to close. In some embodiments, the duration of the resting period is about 45 minutes, but a longer or shorter period of time may be used, if desired. During the resting period, the cow may continue to eat and drink, as desired. At the completion of the resting period, the head lock mechanism 56 may be opened to release the cow, who may then return to the pasture area 46 to lay down.

In practice, it has been found that the cows will tend to move about the barn as a herd, with the result that they will tend to try to enter a feeding station 48 at approximately the same time, and they will thus try to return to the pasture area 46 to lay down at about the same time as well. Accordingly, the number of feeding stations 48 within the feeding and milking area 44 is preferably equal to or greater than the number of cows. In addition, the width of each feeding station 48 is preferably selected to enable the farmer to work around each cow while they are feeding. In practice, a width of approximately 1 meter has been found to be satisfactory, but a larger or smaller width may be used as desired.

As may best be seen in FIG. 5, a floor 58 of the feeding and milking area 44 may be of conventional concrete slab construction to facilitate ease of cleaning. Preferably, the floor 58 extends through the cleaning alley 47 without a step or curb that might create a tripping hazard for the cows. If desired rubber mats or the like (not shown) may be placed on the floor to provide a resilient surface for the cows when they are standing in the feeding stations 48.

The cleaning alley 47 provides a passage for the movement of people and equipment while the cows are locked in the feeding and milking area 44, and also serves to receive both solids and liquid from the pasture area due to movement of cows. At desired times, the cleaning alley 47 may be cleaned by sweeping or scraping in a known manner.

The pasture area 46 generally comprises a raised bed 60 disposed on an impermeable base 66 and having a predetermined slope S extending from a wall 62 toward the cleaning alley 47. Preferably, the impermeable base 66 is substantially level, and may be provided as an extension of the floor 58. Alternatively, the impermeable base may be provided as a layer of clay or clay-soil having a relatively low permeability to liquids. As a further alternative, the impermeable base 66 may be provided as a membrane composed, for example, of a plastic or a rubber composition. The use of an impermeable base 66 effectively prevents contamination of ground and surface water due run-off from the pasture area, and thereby mitigates damaging environmental impacts of the dairy operation.

The front edge of the raised bed 60 (and thus the pasture area 46 as a whole) is preferably defined by the action of a scraper or the like (not shown) used to remove material from the cleaning alley 47. For example, a cleaning blade attached to a tractor may be used to clear material from the cleaning alley 47, in so doing, any material from the raised bed 60 that extends into the cleaning alley 47 will also be removed. This arrangement is beneficial in that it eliminates any tripping hazard to cows walking between the feeding and milking area 44 and the pasture area 46. However, if desired, a low curb 64 (see FIG. 5) may be provided to separate the pasture area 46 from the cleaning alley 47, so as to help retain the materials within the raised bed 60 and establish a level from which the slope S may be established. In such cases, the dimensions of the curb 64 are preferably selected so as to limit the tripping hazard to cows walking between the feeding and milking area 44 and the pasture area 46. For example, a height of the curb 64 may be approximately 8 cm (3.5 inches), although a lower height of the curb 64 is preferable. As may be seen in FIG. 5, the interior of the barn is free of interior barriers(such as walls, fences or the like)such that cows are able to move freely between the feeding and milking area 44, the alley 47, and the pasture area 46.

The wall 62 may be constructed of any suitable material, such as wood or concrete, so as to retain materials within the raised bed 60, and establish an outer perimeter of the pasture area 46. If desired, the wall 62 may be constructed as an outer wall of the pasture barn 42, in which case the wall 62 may be provided with windows or openings (not shown) to allow natural light and/or ventilation air into the barn 62.

Alternatively, the wall 62 may be constructed as a partition within the interior of the pasture barn 42, in which case the wall 62 may have a height selected to retain cows within the pasture area 46 while allowing circulation of air. In either case, it has been found that cows prefer to lean against the wall 62 while lying in the pasture area 46. Consequently, the wall 62 should preferably be constructed with sufficient strength to serve this purpose.

The length L, width W and slope S of the pasture area 46 are preferably selected based on the following criteria:

1) The total area (L×W) of the pasture area 46 should be sufficient to provide at least approximately 4.5 square meters (48 square feet) of area for each cow.

2) The length L and width W of the pasture area 46 should be selected to provide a lying area having a length of approximately k=1.5 meters and a width of approximately w=3 meters for each cow.

3) The slope S of the pasture area 46 is selected to provide adequate removal of liquids from the pasture area 46 while keeping a satisfactory surface on which the cows can lay and rest; and 4) The minimum depth of material in the raised bed 60 is preferably about 8 cm (3.5 inches) and the maximum depth of material in the raised bed 60 is preferably no more than 0.5 meters (19.5 inches).

Criterion 1 above defines the overall size of the pasture area 46, based on the number of cows to be accommodated. In practice, it is found that cows will tend to group together and so will actually occupy less than 4.5 square meters (48 square feet) each when laying down. However, it has been found that provision of a lying area of approximately 4.5 square meters for each cow provides sufficient area for each cow, and minimizes problems of overcrowding. If desired, more than 4.5 square meters for each cow may be provided. As may be appreciated, the allocation of 4.5 square meters for each cow is based on dairy cows of average size. Herds made up of larger and smaller cows can be accommodated on pasture areas sized to provide each cow with more or less than 4.5 square meters, as appropriate. It will be seen that the provision of 4.5 square meters for each cow represents a significantly higher density of animals than is possible in a conventional pack barn. This means that the overall size of a barn required to house a given number of cows is significantly smaller in the present invention that a conventional pack barn designed to house the same number of cows.

Figure 6:
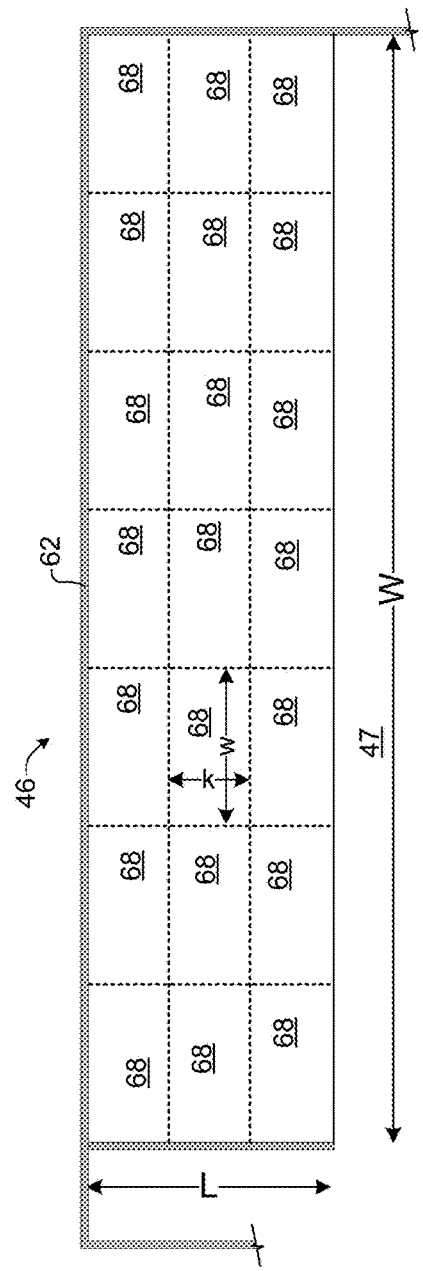
FIG. 6 is a top view illustrating principal proportions of an example pasture area in the pasture barn of FIG. 4.

Criterion 2 above defines the proportional shape of the pasture area 46, again based on dairy cows of average size. In principle, a pasture area 46 having a length L of only 1.5 meters could be used. However, this severely limits the number of cows that can be accommodated on a pasture area having a reasonable width. On the other hand, the length L of the pasture area 46 may be increased (preferably in increments of about 1.5 meters) to accommodate more cows. However, increasing the length L of the pasture area 46 results in increased maximum depth of the bedding material, due to the slope S of the pasture area 46. As noted in Criterion 4, the maximum depth of material in the raised bed 60 is preferably no more than 0.5 meters, which places an effective upper limit on the practical length of the pasture area. In practice, a pasture area length of about L=4.5 meters has been found to be satisfactory. For example, FIG. 6 illustrates a pasture area 46 having a length of L=4.5 meters and a width of W=21 meters, which is sufficient to accommodate 21 cows. In the example of FIG. 6, the lying area 68 allotted for each cow is also shown in dashed lines. Comparing FIGS. 5 and 6, it will be seen that the slope S of the pasture area 46 runs along the length dimension of both the lying area 68 allotted to each cow and the pasture area 46 as a whole. This is due to the fact that cows will tend to lie down across the slope S, so that they will be oriented in the width direction of the pasture area 46. Here again, the provision of a lying area 68 having a length of approximately k=1.5 meters and a width of approximately w=3 meters for each cow is based on dairy cows of average size. For herds made up of larger and smaller cows, the dimensions of the lying area 68 can be increased or decreased, as appropriate, and this may have an effect on the size and shape of the pasture area 46 as a whole.

Criterion 3, above defines the slope S of the pasture area 46. The purpose of the slope S is to provide a mechanism by which liquids (eg urine and water in manure) can seep down into the bedding material away from the cows and then get moved toward the front edge of the pasture area 46 and out into the alley 47 by the combined action of gravity and the movement of the cows. Once the liquids have entered the alley 47, they can be removed from the barn using methods known in the art, such as, for example, a scraper blade or a drag-chain or the like. In practice, it has been found that the slope can vary based on the length of the pasture area 46. For example, satisfactory removal of liquids from a very short pasture area 46 (for example, a pasture area 46 having a length of L=1.5 meters), can be obtained with a substantially zero slope. On the other hand, a pasture area 46 having a length of L=4.5 meters may require a slope of up to approximately 10 percent.

Criterion 4 above defines both the minimum and the maximum depths of material in the raised bed 60. The minimum depth of 8 cm (3.5 inches) provides sufficient material to allow liquids to seep into the bedding material and away from the surface of the raised bed 60. In practice, it has been found that when the depth of material exceeds about 0.5 meters (19.5 inches), it becomes susceptible to saturation with liquid, and requires cultivation to prevent excessive bacterial growth. Maintaining the maximum depth of material in the raised bed 60 to less than about 0.5 meters avoids these problems.

The raised bed 60 itself may be composed of a suitable bedding material, such as, for example, composted manure, shavings, straw or other materials as desired. However, composters capable of properly processing the high volume of manure produced by a typical dairy operation are very expensive and require maintenance of proper conditions of temperature, moisture and oxygenation in order to work properly. Such conditions can be difficult or impossible to maintain, particularly during cold winter months. Other materials such as shavings and straw may be expensive or difficult to obtain in sufficient quantities. Furthermore, materials such straw and shavings tend to break down and rot in a manner that tends to alter the structure of the bedding material and encourages growth of undesirable fungi and bacteria.

Surprisingly, the applicant has discovered that partially dried, un-composted manure can be successfully used as bedding material in the pasture barn 42. For example, the proportion of recycled manure in the bedding material can be up to 100%. In particular, manure can be collected from the barn and dried to a moisture level of less than 60% by weight (preferably 40% by weight or less) using known methods. The partially dried manure can then be applied to the pasture area 46 without further processing. Once the partially dried manure has been applied to the pasture area 46, the activity of the cows tends to distribute and compact the manure to form a relatively compact raised bed 60, from which urine and excess water in fresh manure will readily seep down into the bedding material away from the cows and then get moved toward the front edge of the pasture area 46. This movement of liquids through and out of the raised bed 60 helps to prevent saturation of the bedding material. Furthermore, the depth of bedding material is kept relatively shallow, so that evaporation can also help prevent excessive moisture in the bedding material. The resulting dry condition of the bedding material effectively prevents the growth of excessive fungi and bacteria, resulting in very low Somatic Cell Counts, low rates of mastitis (disease of the udder) and diseases of the hoof. Incidence of mastitis is further reduced by retaining cows in the feeding and milking area 44 for a resting period of at least 45 minutes as described above.

With the pasture area 46 and raised bed 60 constructed as described above, it has been found that relatively little maintenance of the pasture area is required. For example, excess moisture tends to migrate through the bedding material and into the cleaning alley 47 from which it can be removed by conventional methods. This effectively maintains excessive moisture levels in the raised bed 60 without the need for cultivation of the pasture area 46. In practice, fresh manure can be removed from the pasture area 46 and new bedding material added to the pasture area 46 added while the cows are locked into the milking and feeding area 44 being milked. If desired, these operations may be performed by hand, or with the aid of equipment such as a tractor, for example. Such a solution may be satisfactory for very small dairy operations with only a few cows. However, for larger operations, it will be preferable to mechanize these operations.

Figure 7A:
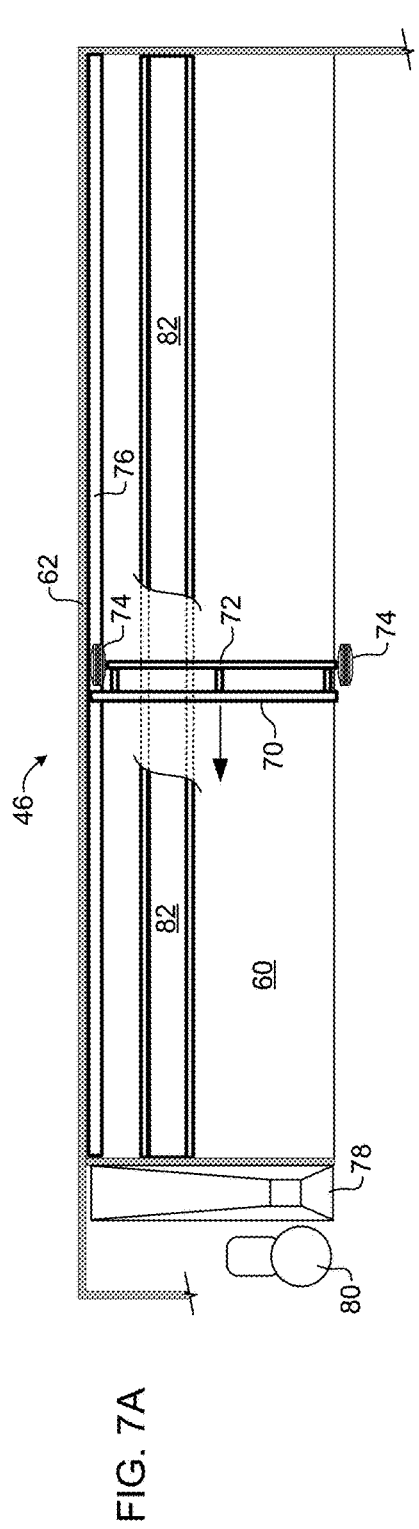
FIGS. 7A and 7B are respective top view and cross-section view showing representative automation equipment usable in the pasture barn of FIG. 4.
Figure 7B:
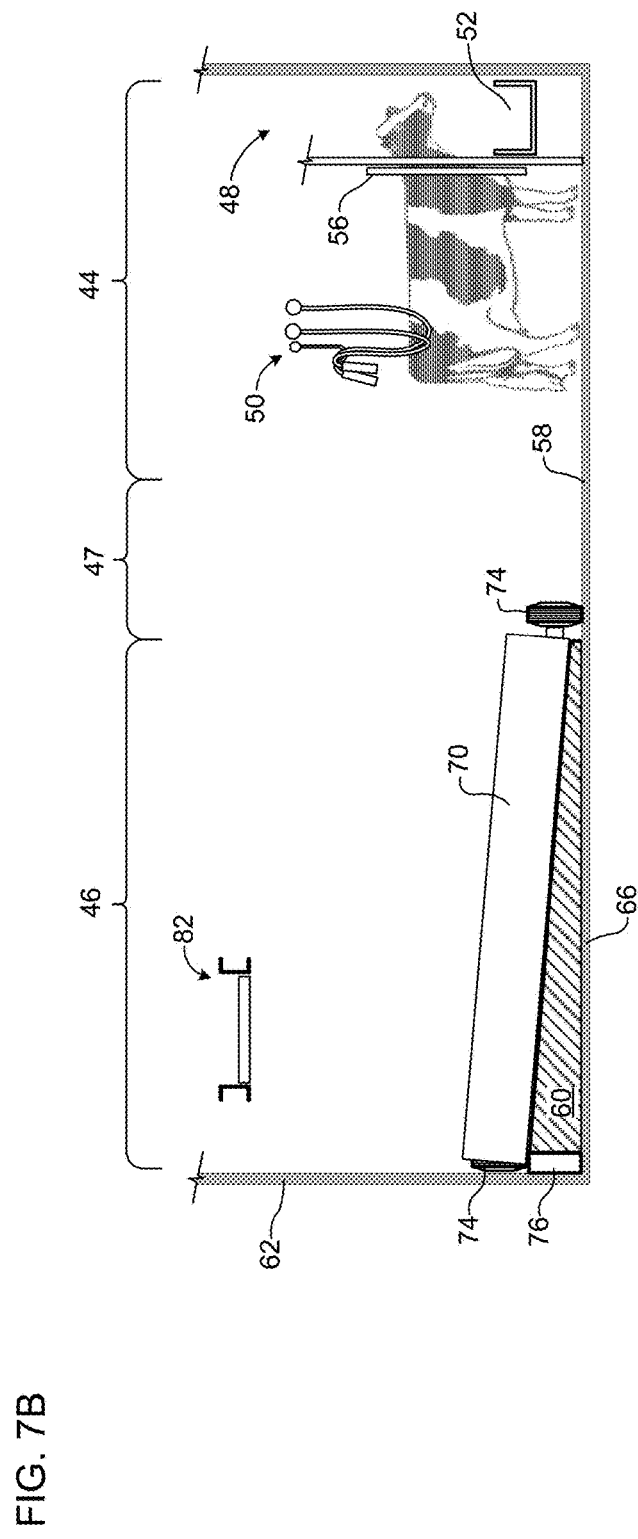

For example, FIGS. 7A and 7B illustrate an embodiment in which a plow blade 70 is used to establish the desired depth and slope of the raised bed 60. Any suitable mounting means may be used to support the plow blade 70. For example, the blade 70 may be mounted on a carriage 72 supported by wheels 74 that run on the floor 58 of the alley 47 and a curb 76 provided for that purpose along the wall 62. In operation the plow blade 70 may be drawn across the pasture area 46 while the cows are locked in the milking and feeding area 44. As the plow blade 70 is drawn across the pasture area 46 (in the direction of the arrow in FIG. 7A), any material (such as fresh manure) protruding above the intended upper surface of the raised bed 60 is caught by the blade 70 as is ultimately pushed off the side of the pasture area 46 and into a hopper or pit 78. From the pit 78, the material may be supplied to a manure separator 80 for reducing the total moisture content of the material.

Any suitable manure separator 80 may be used. For example, commercially available mechanical manure presses that operate by forcing wet manure against a screen to separate out the water may be used. Commercially available mechanical manure presses of this type are known to be able the handle large volumes of manure, and can reliably produce a manure solids product having a moisture level of 60% by weight, or less. Preferably, the moisture level of less than 40% by weight (for example, 34% by weight) is obtained In some cases, the moisture level of the material removed from the pasture area 46 by the plow blade 70 will have to be raised in order for the manure separator 80 to work properly. In such cases, water removed by the manure separator 80 during a previous cycle may be recycled and added to the material in the hopper or pit 78. At least some of the manure solids product output from the manure separator 80 may be reapplied to the raised bed 60 of the pasture area 46 as bedding material. Excess manure solids product (that is, manure solids product exceeding what is needed to make up lost material from the raised bed 60) may be composted, stored and/or used as fertilizer, as desired. Similarly, excess water separated from the manure (that is, separated water exceeding what is needed to raise the moisture level of the material removed from the pasture area 46 by the plow blade 70) may be used as a fertilizer.

FIGS. 7A and 7B also illustrate an example conveyor system 82 which may be used to supply new bedding material, such as, for example manure solids product from the manure separator 80) to the raised bed 60. For example, commercially available belt-type or auger-type conveyors suitable for handling dry particulate materials may be used. If desired, the conveyor system 82 may be mounted suspended from a ceiling (not shown) of the barn 42 in a manner known in the art. Preferably, the conveyor is configured to deposit new bedding material on the raised bed 60 relatively near the mid-way between the wall 62 and the alley 47. With this arrangement, the movement of cows within the pasture area 46 may effectively distribute the bedding material about the raised bed 60 such that further spreading of the bedding material (either mechanically or manually by the farmer) is not needed.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A barn for housing dairy cows, the barn comprising:
    a feeding and milking area comprising a plurality of feeding stations, each feeding station including:
        a manger configured to permit a cow to obtain dry feed;
        a waterer configured to permit the cow to obtain drinking water; and
        a head lock configured to releasably secure the cow in the feeding station while the cow is being milked;
    an alley adjacent the feeding and milking area; and
    a pasture area extending between the alley and a wall of the barn, the pasture area configured to permit a plurality of cows to lay down, the pasture area including a raised bed disposed on a level impermeable base, the raised bed including a bedding material having a variable depth selected to define a predetermined slope extending between the alley and the wall, the predetermined slope selected to facilitate removal of excess liquid from the pasture area, the bedding material composed of partially dried un-composed manure having a moisture content of less than 60% by weight prior to being applied to the raised bed; and
    the barn being free of interior barriers such that cows are able to move freely between the feeding and milking area, the alley, and the pasture area.

2. The barn as claimed in claim 1, wherein the head lock is controlled to secure the cow in the feeding station for a predetermined rest period after milking.

3. The barn as claimed in claim 2, wherein the predetermined rest period is at least 45 minutes.

4. The barn as claimed in claim 1, wherein the predetermined slope of the raised bed is approximately 10% or less.

5. The barn as claimed in claim 1, wherein a total area of the pasture area is selected to provide at least approximately 4.5 square meters of area for each cow.

6. The barn as claimed in claim 1, wherein a length and a width of the pasture area are selected to provide a lying area having a length of 1.5 meters and a width of 3 meters for each cow.

7. The barn as claimed in claim 1, wherein a maximum depth of bedding material in the raised bed is 0.5 meters.

8. The barn as claimed in claim 1, wherein the moisture content is 40% by weight or less prior to being applied to the raised bed.

9. The barn as claimed in claim 1, further comprising a conveyor for distributing bedding material onto the raised bed.

10. The barn as claimed in claim 1, further comprising a plow blade configured to remove material off of the raised bed.

11. The barn as claimed in claim 10, wherein the plow blade is further configured to define a predetermined upper surface of the raised bed, and to remove material protruding above the upper predetermined surface.

12. The barn as claimed in claim 10, further comprising a hopper for receiving material removed off the raised bed by the plow blade.

13. The barn as claimed in claim 12, further comprising a manure separator connected to receive material from the hopper, and configured to process the received material to produce a dry manure product having a moisture content of 60% by weight or less.

* * * * *